FORCED ENTRY RESISTANT SECURITY FILE CONSTRUCTION

Filed Sept. 30, 1960 6 Sheets-Sheet 1

INVENTORS
Harry Paulos and
BY Roland G. Blauvelt
Frease, Bishop, Johns & Schick
ATTORNEYS

FORCED ENTRY RESISTANT SECURITY FILE CONSTRUCTION

Filed Sept. 30, 1960

INVENTORS
Harry Paulos and
BY Roland G. Blauvelt
Frease, Bishop, Johns & Schick
ATTORNEYS July 2, 1963 H. PAULOS ET AL 3,095,838

FORCED ENTRY RESISTANT SECURITY FILE CONSTRUCTION

Filed Sept. 30, 1960 6 Sheets-Sheet 3

INVENTORS
Harry Paulos and
BY Roland G. Blauvelt
Frease, Bishop, Johns & Schick
ATTORNEYS

FORCED ENTRY RESISTANT SECURITY FILE CONSTRUCTION

Filed Sept. 30, 1960

6 Sheets-Sheet 4

INVENTORS
Harry Paulos and
BY Roland G. Blauvelt
Frease, Bishop, Johns & Schick
ATTORNEYS

FORCED ENTRY RESISTANT SECURITY FILE CONSTRUCTION

Filed Sept. 30, 1960

INVENTORS
Harry Paulos and
Roland G. Blauvelt
BY
Frease, Bishop, Johns & Schick
ATTORNEYS INVENTORS
Harry Paulos and
Roland G. Blauvelt
BY Fresse, Bishop, Johns & Schick
ATTORNEYS 3,095,838

FORCED ENTRY RESISTANT SECURITY FILE CONSTRUCTION

Harry Paulos, Canton, and Roland G. Blauvelt, Hamilton, Ohio, assignors to Diebold, Incorporated, Canton, Ohio, a corporation of Ohio Filed Sept. 30, 1960, Ser. No. 59,566
9 Claims. (Cl. 109—80)

The invention relates generally to filing cabinet construction and more particularly to a filing cabinet housing construction which is resistant to forced entry.

Filing cabinets of the general type classified as security files are usually constructed with a plurality of drawers having a drawer front mounted on each drawer. The drawers are carried on tracks or a drawer suspension within a housing. This housing generally is constructed of inner and outer steel shells. The space formed by the inner and outer shells is generally filled with a fire-resistant and heat-resistant insulation material. Likewise, the drawer fronts are formed of inner and outer members which have a fire-resistant and heat-resistant insulation material therebetween.

These cabinets are usually provided with a gang locking mechanism which locks all drawers, usually four, when in the closed position. Likewise, a combination lock mechanism or the like is usually provided to lock the gang locking mechanism when in its locked position.

If the filing cabinets are security files, they also are provided with other features or devices to prevent the destruction of the material contained in the file or to prevent an unauthorized entry into the file to gain access to the contained material. Drill-resistant plates are frequently provided in and around the locking mechanisms so that a prospective burglar is retarded from gaining entrance to the interior of the file by damaging or destroying the locking mechanisms. Frequently material such as chicken wire or expanded metal is embedded in the heat insulation material lining the cabinet walls for the dual purpose of providing strength to the heat insulation material and also to foul any drill which may be used to gain entrance into the interior of the file.

The construction of the present invention is an improvement on the security file construction disclosed in Henkel Patent No. 2,803,203, the filing cabinet construction disclosed in Belew Patent No. 2,804,364 and the security file construction disclosed in Henkel et al. Patent No. 2,887,965.

The Federal Government has established specifications for insulated steel security filing cabinets. These specifications are set forth in Federal Specification AA–F–357*b*, February 13, 1959, as revised. The file specification classifies various files according to the file's ability to withstand surreptitious entry and forced entry for different periods of time.

The forced entry test which is provided in the Federal specification is as follows:

> "There shall be no limitation on the time required for exploration and preparation for surreptitious or forced entry tests. The tools and devices used in this test will be limited to those powered by hand such as, but not limited to, metal cutters, hammers, pullers, and pinch bar, not more than 20 inches in length when disassembled or folded, which can be carried in a case not exceeding 1.5 cubic feet in volume and 9 inches in thickness, and which do not exceed a total weight of 25 pounds (exclusive of weight of case). Neither explosives nor the application of heat such as that from a blow torch or an electric arc shall be used. Not more than two men will be used simultaneously during each attempt at entry. Cabinets shall be tested for various methods of entry."

To qualify as a Class 1 cabinet, a file must resist surreptitious entry for 20 man-minutes and forced entry for 20 man-minutes. To qualify as a Class 2 cabinet under these specifications the file must resist forced entry for 5 man-minutes and surreptitious entry for 20 man-minutes.

A particular test which has been devised as being the most stringent to achieve forced entry is known as the "wedge test." The operator in carrying out the wedge test uses a wedge type instrument which is formed of a 3 x 3 x ½" steel base to which triangular strips of steel converging to an apex point are welded. The edges and the point of this wedge are extremely sharp. The entire length of the wedge is between 16 and 18 inches. Such a wedge weighs approximately 12 pounds. The operator or person conducting the test then attempts to drive the wedge with a 12 pound sledge hammer into the side of the cabinet or for that matter any other place in the cabinet which might provide a hole of sufficient size to insert a hand to gain access to the documents contained therein. The combined weight of the wedge and sledge is thus 24 pounds, just under the 25 pound weight limit for tools which may be used to achieve forced entry.

For the five minute forced entry test provided in the Federal specification, the person conducting the test is permitted five minutes during which he may, with the wedge and sledge hammer, try to form a hole in the side of the cabinet large enough to permit him to withdraw any documents which may be contained in the cabinet. As required by the specification, successful entrance into the file is not accomplished unless an opening nine square inches in area has been formed.

The five minute period is in man minutes. Therefore, if more than one man performs the test, the five minute period is divided by the number of men conducting the test to determine the total amount of time which these men have to gain entrance into the file.

Security files which are designed to meet the requirements of this five minute wedge test must also meet other specifications. For example, there are limits as to size, length, width and height, for which specifications have been established. Heat and fire-resistance requirements must also be met.

More importantly, there is a weight requirement which must be met by these files. That is, these security files must weigh no more than 250 pounds per square foot of base area. For files which may have 4.64 square feet of base area, the total allowable weight is 1160 pounds.

Prior to this invention, no file has been known to have been manufactured commercially which will pass the five minute wedge test requirements and at the same time meet the weight and fire-resistant requirements. Files which have previously been manufactured have either been extremely overweight or the forced entry test has not been passed.

It is, therefore, a primary object of the present invention to provide a security file which will pass the five minute forced entry wedge test.

It is further an object of the present invention to provide a security file which will be resistant to forced entry as determined by the five minute wedge test and at the same time meet the weight requirements set forth above.

It is still further an object of the present invention to provide a security file construction which is resistant to forced entry, which is of minimum weight, and which at the same time provides maximum heat and fire-resistance protection for documents contained therein.

Moreover, it is an object of the present invention to provide a new security file construction modifying the construction of Patent No. 2,887,965 to the extent that the file will pass the five minute forced entry wedge test and meet weight requirements without altering the general construction of the patented file, so that the production tools and facilities for the patented file may be used for the continued production of the improved file.

Finally, it is an object of the present invention to provide a new security file construction which for the first time, satisfies heretofore unsatisfied forced entry wedge test requirements within weight limitations, and which at the same time avoids costly design changes and tooling, and achieves the stated objects in a simplified and inexpensive manner.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the following general statement, preferred embodiments of which—illustrative of the best modes in which applicants have contemplated applying the principles—are set forth in the following description and shown in the drawings, and which are particularly and distinctly pointed out and set forth in the appended claims forming part hereof.

The nature of the improved forced entry resistant security file construction of the present invention may be stated in general terms as including in an insulated security file of a type having a five-sided cabinet provided with side, rear, top and bottom insulated walls and a plurality of drawers having insulated drawer heads removably mounted in said cabinet; the combination of a duplex-walled, forced-entry-resistant shell in the cabinet walls; the shell including a bottom plate, inner and outer side plates forming two spaced side walls, inner and outer top plates and inner and outer back plates; the bottom plate and outer side, top and back plates being secured together as an integral structure; the inner side, top and back plates being located in an unrestrained position by the integral structure; and all of the plates from which the duplex-walled shell is formed preferably being aluminum alloy plates from ⅛″ to ¼″, preferably 3/16″ in thickness; whereby the duplex-walled shell resists penetration by a wedge when it is attempted to drive the wedge through a wall of the cabinet.

By way of example, embodiments of the improved forced entry resistant security file construction, and parts thereof, of the present invention, are illustrated in the accompanying drawings forming part hereof, in which.

Similar numerals refer to similar parts throughout the various figures of the drawings.

Figures 1, 6:
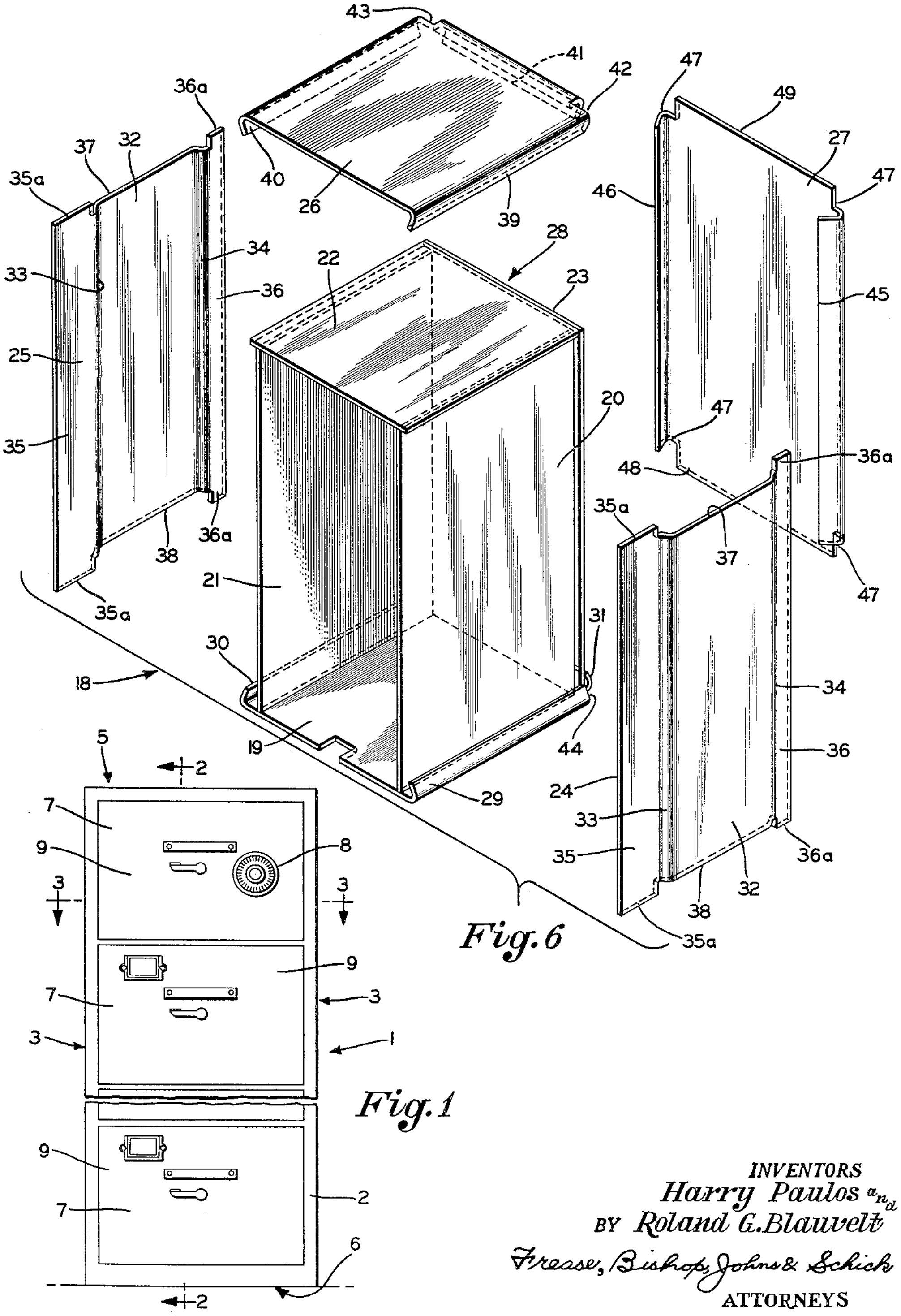
FIG. 1 is a front elevational view, with parts broken away, of a steel multi-drawer insulated security filing cabinet, constructed in accordance with the invention.
FIG. 6 is an exploded perspective view of the parts shown in FIG. 5.

The security file illustrated in the drawings, generally designated 1 in FIG. 1, is basically the same file illustrated and described in Patent No. 2,887,965. The file 1 includes a five-sided file cabinet 2, having side walls 3, a rear wall 4, a top wall 5 and bottom wall 6, all of which are insulated. The cabinet 2 may house a plurality of usual filing drawers 7 movably mounted in the housing on usual drawer suspensions and having typical locking mechanism which may include a combination lock 8.

The details of the drawer construction, drawer suspension, and locking mechanism as well as certain details of drill resistant armor plate inserts, are not illustrated since these elements may be constructed in accordance with the disclosure of said Patent 2,887,965.

Each drawer 7, may include an insulated drawer head 9 (FIG. 3) so that when all of the drawers are closed, the drawer heads form the sixth insulated wall of the file.

The insulated cabinet walls and drawer heads are provided with usual insulation material 10, filling the space between the outer shell 11 and inner shell 12 of the cabinet 2. A usual reinforcing wire mesh or expanded metal 13 may be embedded within the insulation material 10.

The outer cabinet shell 11 and inner cabinet shell 12, each may be fabricated from light gauge, preferably steel sheet members, in the usual manner to form the cabinet wall compartments within which the insulation material 10 is contained. Overlapping flanges 14 and 15 of the outer shell, and 16 of the inner shell may be spot-welded together; and overlapping flanges respectively of the inner and outer shell may also be spot-welded together as indicated at 17.

In the construction of Patent 2,887,965, a supplemental housing was provided to reinforce the rigid shell in an attempt to retard forced entry. This supplemental housing comprised a single ply of aluminum sheeting metal contiguous with and overlying the side, rear, top and bottom walls of the light gauge inner steel shell. The edges of the aluminum sheeting of the supplemental housing were welded either together at spaced intervals or to the inner steel shell at spaced intervals to form a rigid structure.

Figure 9:
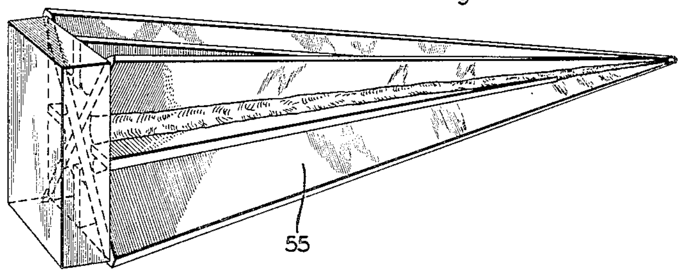
FIG. 9 is a perspective view of a typical wedge instrument used in carrying out the five minute forced entry wedge test, the requirements of which are met by the improved construction.

However, this prior construction of Patent 2,887,965, which satisfied weight requirements, was never able to resist forced entry for five man-minutes. It has been possible for one man to drive a twelve pound wedge such as shown in FIG. 9 with a twelve pound sledge through a wall of the cabinet of Patent No. 2,887,965 and form an opening more than nine square inches in area in substantially less than five minutes.

Prior to the present invention, no other insulated security file was known, which satisfied weight requirements or limitations, and at the same time was able to pass the five minute forced entry test, as performed with the wedge test described. Thus the Federal specifications for Class 2 insulated security filing cabinets have been waived up to the present; and there has been an existing unsatisfied need and unsolved problem of providing an insulated security filing cabinet construction which could pass the five minute forced entry test and qualify as a Class 2 cabinet while also meeting weight requirement limitations. In other words, it is theoretically possible to satisfy the five minute forced entry test by adding sufficient armor plate to the cabinet walls; but the weight of such armor plate increases the cabinet weight way beyond the weight limitation described.

Figures 5, 7:
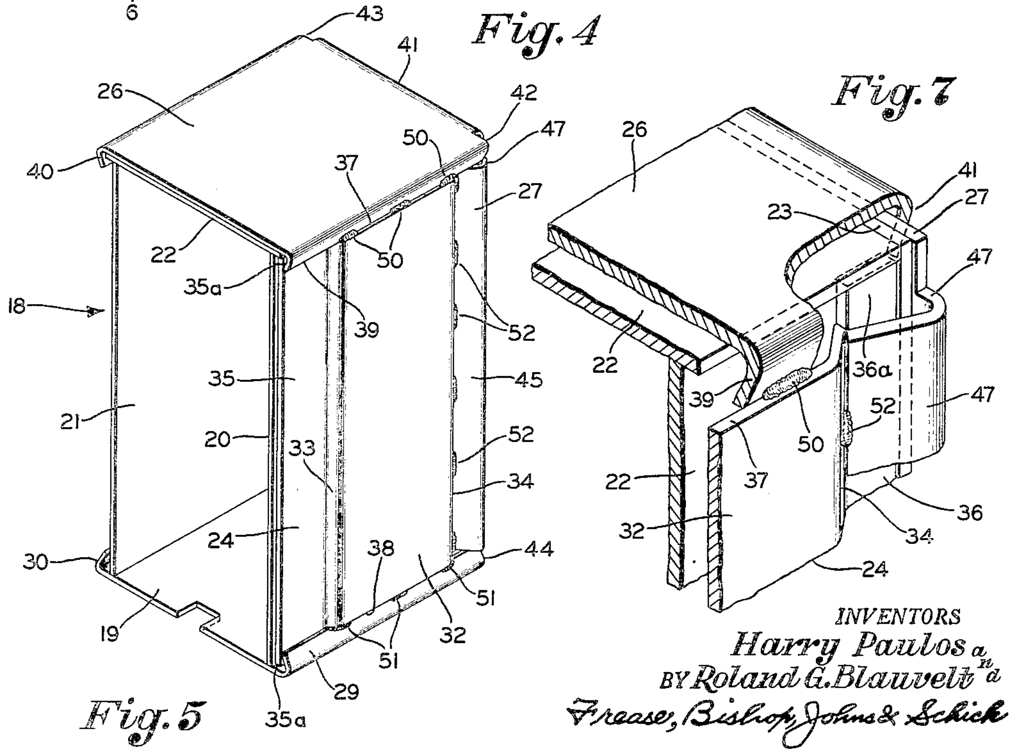
FIG. 5 is a somewhat diagrammatic perspective view of a duplex-walled, supplemental, forced-entry-resistant shell incorporated in the file of FIG. 1, in accordance with the invention.
FIG. 7 is an enlarged fragmentary perspective view, with parts broken away, of the upper rear right hand corner of the shell illustrated in FIG. 5.

In accordance with the invention, a duplex-walled, supplemental, forced-entry-resistant shell generally indicated at 18 and best shown in FIG. 5, is incorporated in the wall structure of the cabinet 2. Referring to FIGS. 5, 6, 7 and 8, the duplex-walled shell 18 comprises a bottom plate 19, inner side plates 20 and 21, an inner top plate 22, an inner back plate 23, outer side plates 24 and 25, an outer top plate 26 and an outer back plate 27.

The bottom plate 19 has an upturned and slightly inturned hook shaped flange 29 at one side edge and a similar flange 30 at its other side edge as well as a similar flange 31 at its back edge. Each outer side plate 24 and 25 has an outward vertically extending offset portion 32 connected by the shoulders 33 and 34 with front and rear vertically extending flanges 35 and 36. The top and bottom edges of the offset portion 32 are cut back or notched at 37 and 38. The upper and lower ends of the front and rear flanges 35 and 36 of the outer side plates 24 and 25 project beyond the notched-out ends 37 and 38 of the offset portion 32, to form ears *35a* and *36a*.

The outer top plate 26 has a downturned and slightly inturned hook flange 39 at one side edge, a similar flange 40 at the other side edge and also similar flange 41 at its back edge. The plate 26 has notched-out corners 42 and 43 between the side flanges 39 and 40 and the back flange 41. The bottom plate 19 similarly has notched corners indicated at 44 in FIG. 6.

The outer back plate 27 has a forwardly and somewhat inturned flange 45 at one side edge and a similar flange 46 at its other side edge. Each of the four corners of the outer back plate 27 are notched out at 47 so that the flange portions 45 and 46 do not run from top to bottom of outer back plate 27.

The duplex-walled shell 18 is constructed and assembled in a particular manner to achieve the forced-entry-resistant result. The inner light gauge sheet steel walled cabinet shell 12, is assembled and spot-welded at 16 to form a self-sustaining five-sided box-like structure. This inner shell 12 is then placed on top of the bottom plate 19 which is to form part of the duplex-walled shell 18 in the relative position shown in FIGS. 2 and 4. The inner side plates 20 and 21 are then placed contiguously against the outer surfaces of the side walls of inner steel shell 12 in the positions shown in FIGS. 3 and 4. Inner top plate 22 is then placed on top of the inner steel shell 12 in the position shown in FIGS. 2 and 4. The inner back plate 23 is then placed contiguously against the back wall of the inner shell 12 in the position shown in FIGS. 2 and 3.

These plates 19, 20, 21, 22 and 23 thus are in effect, free-standing and unrestrained but are held by assembly clamps (not shown) temporarily for further assembly. They are neither connected together or to inner steel shell 12 in any manner. Their positions, as thus assembled, are best shown generally at 28 in FIG. 6 with the inner steel shell walls omitted to more clearly show the arrangement. Also, for the purpose of simplicity of illustration, the width, depth and height of the assembled duplex-walled shell 18 illustrated in FIG. 5 and the assembly of plates 19, 20, 21, 22 and 23 as shown in FIG. 6, are somewhat out of proportion. That is, for a usual filing cabinet with the height of the shell 18 determined, the side walls would be somewhat closer together, relatively, and the shell would be somewhat deeper from the open front to the back wall, than as shown.

Figure 3:
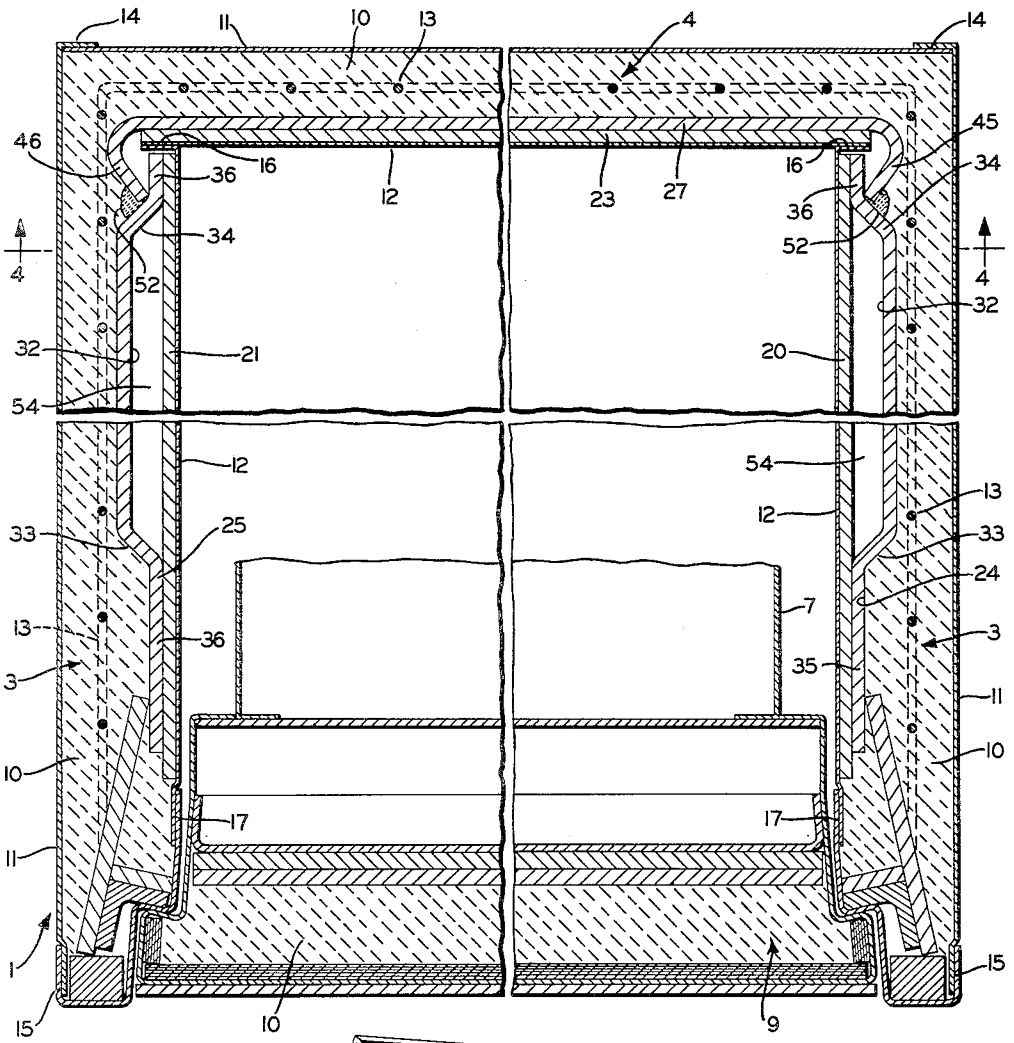
FIG. 3 is a similar horizontal sectional view, looking in the direction of the arrows 3—3, FIG. 1.
Figure 4:
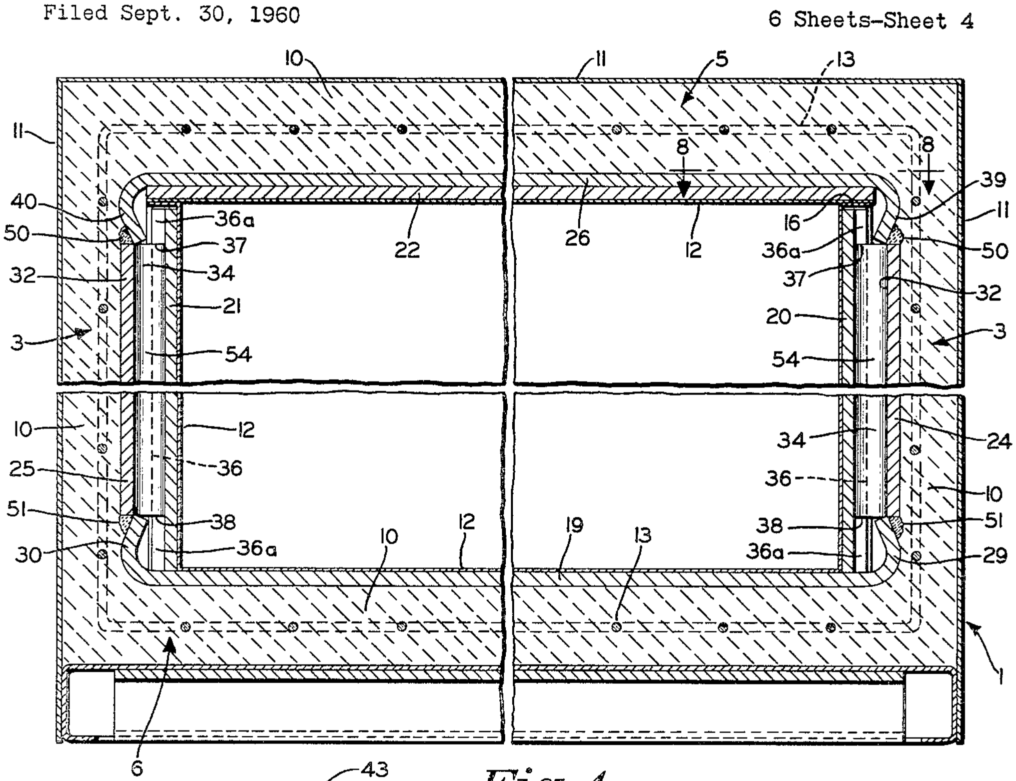
FIG. 4 is a similar vertical cross-sectional view, looking toward the back wall of the cabinet in the direction of the arrows 4—4, FIG. 3.

With the plates 19, 20, 21, 22 and 23 thus assembled with inner steel shell 12, outer side plates 24 and 25 are placed in position against inner side plates 20 and 21 with the lower ears *35a* and *36a* engaged and trapped by flanges 29 and 30 of bottom plate 19, as shown in FIGS. 4 and 5. When thus assembled, flanges 35 and 36 of plates 24 and 25 lie flatwise in abutment with the front and rear outer vertical surface portions of inner plates 20 and 21. The offset portions 32 of plates 24 and 25 are spaced outwardly of inner side plates 20 and 21 as well shown in FIGS. 3 and 4.

With the outer side plates 24 and 25 so positioned, the outer back plate 27 may be slipped downward and placed in contiguous abutment with the inner back plate 23. In this position, as shown in FIGS. 2, 3, 5, 7 and 8, the lower portion 48 of outer back plate 27 between notches 47 is trapped between rear flange 31 of bottom plate 19 and the inner back plate 23 (FIG. 2).

Also, in this position, the side flanges 45 and 46 of the outer back plate 27 are engaged over the rear flanges 36 of outer side plates 24 and 25, with the terminal edges of flanges 45 and 46 lying along the shoulders 34 of outer side plates 24 and 25 as shown in FIGS. 3, 5 and 7. Thus, the outer side plates 24 and 25 are trapped in position against the inner side plates 20 and 21.

Figure 2:
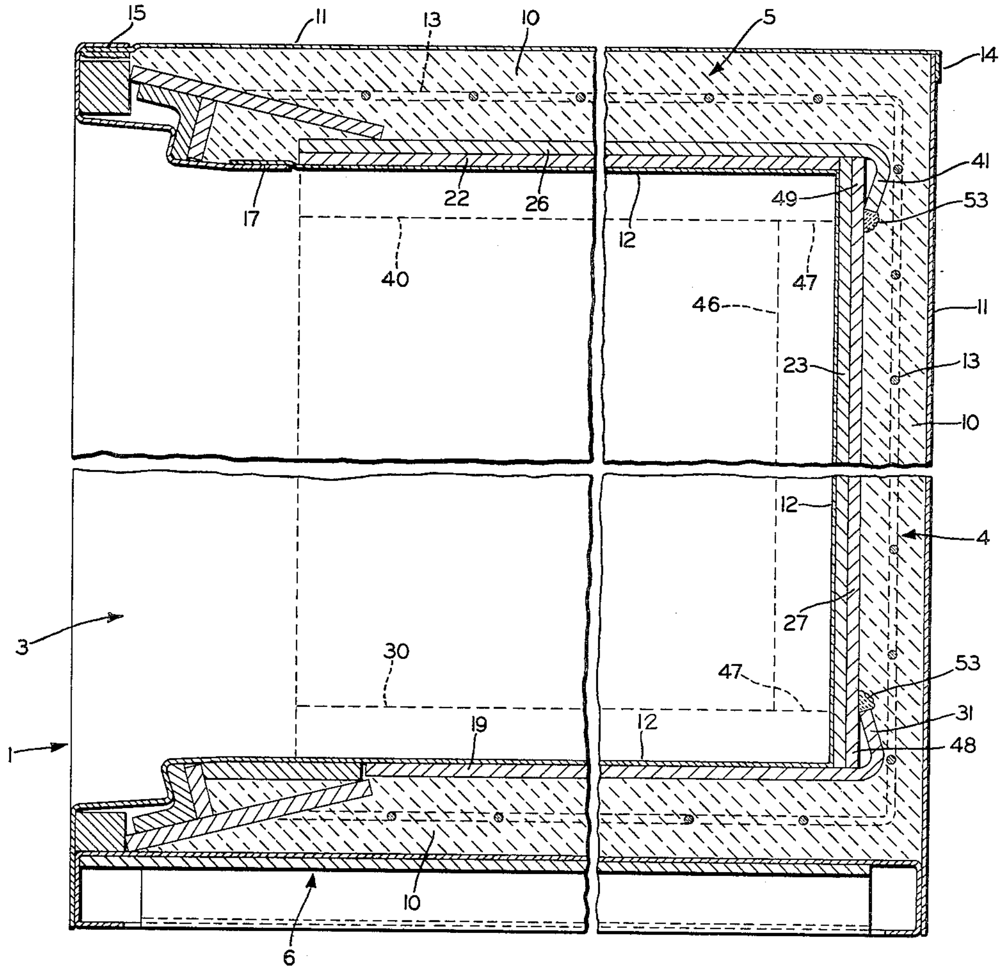
FIG. 2 is an enlarged vertical sectional view, with parts broken away, of the improved construction looking toward one side of the cabinet in the direction of the arrows 2—2, FIG. 1.
Figure 8:
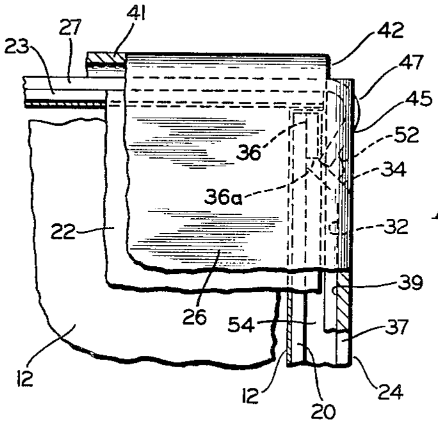
FIG. 8 is an enlarged fragmentary plan sectional view of the parts illustrated in FIG. 7, looking in the direction of the arrows 8—8, FIG. 4.

The outer top plate 26 may then be slipped over the top end of the assembly to the position shown in FIGS. 2, 4 and 5. When the outer top plate 26 is so positioned, side flange 39 is engaged over the upper ears *35a* and *36a* of outer side plate 24, the side flange 40 is engaged over the upper ears *35a* and *36a* of side plate 25, and the back flange 41 is engaged over the upper portion 49 of outer back plate 27 which is notched out at 47.

When all of the outer plates 24, 25, 26 and 27 are assembled at the sides, top and back of the inner plate assembly 28, as generally shown in FIG. 5, the terminal edges of flanges 39 and 40 of the outer top plate 26 lie along and adjacent the upper notched edges 37 of the offset portions 32 of the outer side plates 24 and 25. The notched portions 37 are formed in order to receive these flanges 39 and 40, as shown in FIGS. 4, 5 and 7.

The adjacent edges of the terminal edges of flanges 39 and 40 and notched upper ends 37 of plates 24 and 25 are then welded together at intervals as indicated at 50. Similarly, the notched end portions 38 at the lower ends of offsets 32 of side plates 24 and 25 receive and are located adjacent the terminal edges of flanges 29 and 30 of bottom plate 19. These parts similarly may be welded at spaced intervals as indicated at 51. Similarly, the terminal edges of flanges 45 and 46 of outer back plate 27 which lie along shoulders 34 of outer side plates 24 and 25, may be welded at spaced intervals as indicated at 52. Also, as shown in FIG. 2, the back flange 31 of bottom plate 19 and the back flange 41 of outer top plate 26, may be welded at spaced intervals to the outer back plate 27 as indicated at 53.

In this manner, the outer plates 24, 25, 26 and 27 and the bottom plate 19 of the duplex-walled shell 18, form an integral structure as indicated in FIG. 5 with the inner plates 20, 21, 22 and 23 trapped between the outer plates and the inner steel shell 12. However, the trapped inner plates 20, 21, 22 and 23 at the sides, top and back walls of the duplex-walled shell 18, are free to move if force is applied thereto since they are unconnected, except for the minor restraint provided by the inner steel shell 12. However, the inner steel shell 12 is formed of such light gauge sheet steel that it is unable to hold the inner unrestrained plates 20, 21, 22 and 23 against motion in event that force is applied to the inner plates.

Referring to the notched back portions 37 and 38 of outer side plates 24 and 25 which receive the side flanges 29, 30, 39 and 40 of the bottom plate 19 and outer top plate 26; the notched corners 47 in the outer back plate 27, have the same notched depth as the notched ends 37 and 38. Thus the side flanges 29, 30, 39 and 40 extend from front to rear of the duplex-walled shell 18, as best shown in FIG. 5.

In this manner, the upper and lower ends of the cavities or chambers 54 formed between the offset portions 32 of outer side plates 24 and 25 and the inner side plates 20 and 21 (FIG. 3) are substantially sealed off for a purpose to be later described.

In accordance with the invention, the plates 19–27 forming the duplex-walled shell 18, may be ⅛" to ¼" and preferably 3/16" thick aluminum alloy plates. For example a 6061–T6 aluminum alloy may be used which has a 45,000 p.s.i. ultimate strength, a 40,000 p.s.i. yield strength, and 12% elongation in 2" for a 1/16" thick specimen.

The duplex-walled shell 18, in accordance with the invention are incorporated in the construction and assembly of the insulated filing cabinet 1, as best shown in FIGS. 2, 3 and 4. An insulated cabinet constructed in this manner contains less insulation material 10 in its walls because of the space occupied by the outer plates 24, 25, 26 and 27 as well as the cavities 54 provided by the offset portions 32 of outer side plates 24 and 25. These spaces and cavities otherwise would be occupied by insulation material 10 if the plates 24, 25, 26 and 27 were not present. This decrease in weight of insulation material approximately offsets the increased weight due to the presence of plates 24, 25, 26 and 27.

The decreased amount of insulation material, particularly in the side walls does not harmfully reduce the heat resisting properties of the insulated walls, because the dead air space in cavities 54 also provides heat insulating properties. Accordingly, neither insulating properties nor the weight of the file is substantially affected by the inclusion in the file construction of the duplex-walled forced-entry-resistant shell 18.

It has been indicated that the cavities 54 are substantially sealed at the top and bottom open ends thereof by the flanges 29, 30, 39 and 40. This sealing prevents insulation material from filling the cavities 54 when the insulation material is poured during fabrication of the file in the usual manner, into the space between the inner steel shell 12 and the outer steel shell 11.

Figure 10:
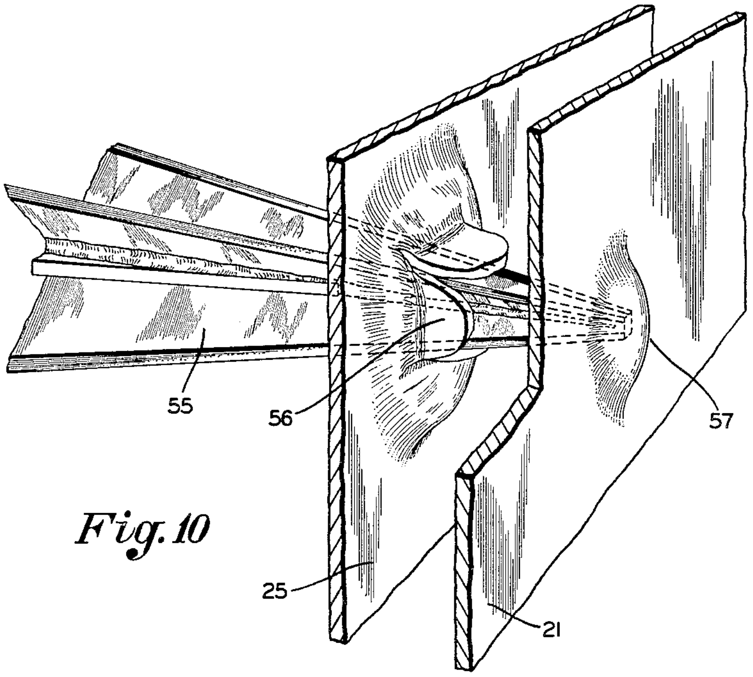
FIG. 10 is a fragmentary diagrammatic perspective view illustrating the typical result when it is attempted to drive the wedge of FIG. 9 through one of the side walls of the security file of FIG. 1 constructed in accordance with the invention.

Referring to FIGS. 9, 10, 11 and 12, when a forced entry wedge test is made on the improved construction by attempting to drive a wedge instrument 55, illustrated in FIG. 9, into a side wall of the cabinet (the wedge 55 weighing approximately twelve pounds and a twelve pound sledge being used in accordance with wedge test procedure), the wedge readily and rapidly penetrates the outer light gauge sheet steel cabinet shell 11, as well as the insulation material 10, and may penetrate the outer aluminum alloy plate 24 or 25, as indicated at 56 in FIG. 10, to cut or tear an opening therein.

The cutting or tearing of the opening in the aluminum alloy plate 25, is accompanied by retardation of movement of the wedge 55 through the opening being formed due to the resistance of the metal. Also, some "seizure" or "seizing" occurs between the aluminum alloy metal of the plate and the penetrating steel surfaces of the steel wedge instrument 55.

As the point or apex of the wedge engages the inner plate 21 of the duplex-walled shell 18, which is spaced from the outer side plate 25, the wedge point will indent, bulge or bend the engaged portion of the inner plate 21, as indicated at 57. However, the inner plate 21 is not penetrated but appears to give way and then to bounce back with each blow struck. This giving or yielding and bounce-back apparently result for several reasons.

First, the unrestrained positioning of the inner side plates of the duplex-walled shell 18 as described, permits the engaged plate to move and absorb the force of a blow struck against the wedge 55. Such motion may be accompanied by tearing out of the inner light gauge sheet metal shell 12. Second, the inherent springiness, formability and ductility of the aluminum plate particularly when unconnected with any other member, permits such motion and bounce-back. Third, the seizure between the aluminum of plate 25 and the steel wedge member 55, so retards the force of any blow, that insufficient force results at the point of the wedge member 55 to penetrate plate 21.

Whatever may be the reason for the inability to penetrate the inner plate 21, the fact remains that in actually performing a wedge test under the requirements indicated, it has not been possible to form a hole through a wall of a file, constructed in accordance with the invention, having an area of at least nine square inches, in less than 5 man-minutes.

Figure 11:
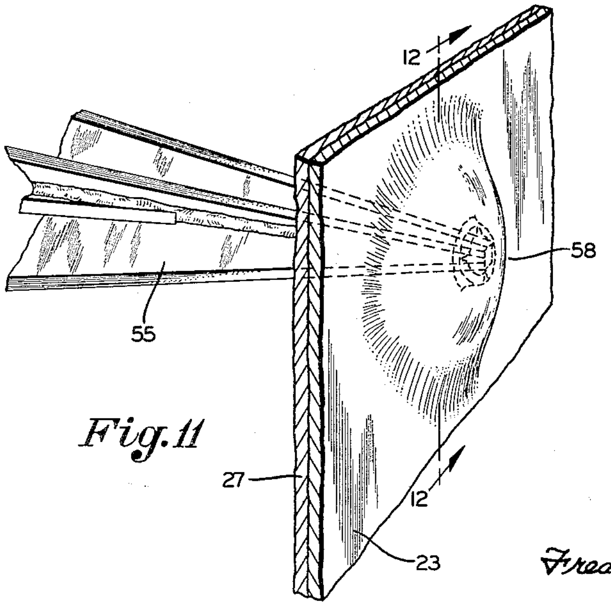
FIG. 11 is a view similar to FIG. 10 illustrating the result of an attempt to drive the wedge instrument of FIG. 9 through the top or back wall of the security file of FIG. 1.
Figure 12:
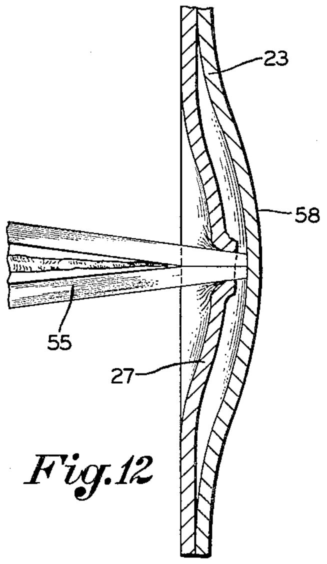
FIG. 12 is a sectional view looking in the direction of the arrows 12—12, FIG. 11.

FIGS. 11 and 12 illustrate diagrammatically substantially what occurs when it is attempted to drive the wedge through either the top wall or the rear wall of the construction shown in FIGS. 1 through 8 where the outer and inner plates are contiguous and do not have cavities 54 formed therebetween. Here again, as applied to the back wall, the wedge 55 readily penetrates outer shell 11, insulation material 10 and outer aluminum plate 27. However, excepting for indenting the inner plate 23 as indicated by bulge 58, the wedge instrument 55 fails to penetrate the inner back plate 23 but gives and bounces back after each blow accompanied by seizure of the wedge in the opening formed through plate 27.

The improved construction thus described is the first known insulated security filing cabinet construction meeting the wedge and fire resistance requirements for such files, and which has withstood a forced entry wedge test for more than five minutes. The improved construction thus has been the first file to pass the test for a Class 2 cabinet under the Federal specifications described above.

Figure 13:
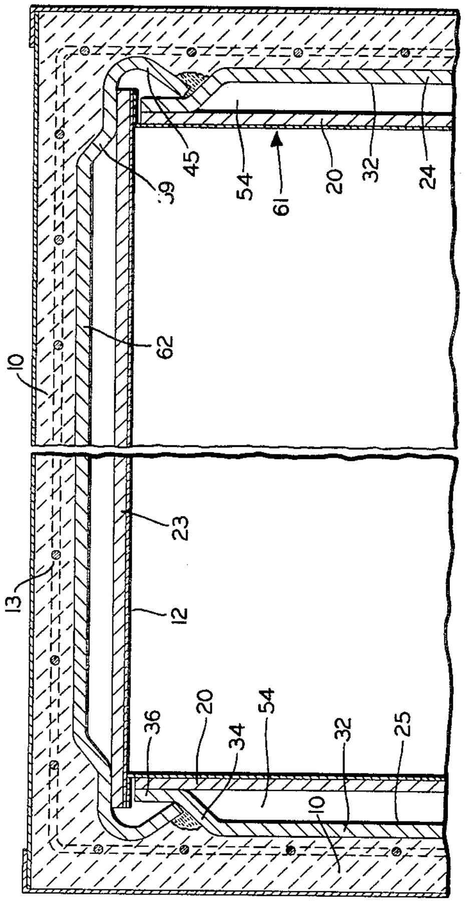
FIG. 13 is a view similar to FIG. 3 of a modified form of construction.
Figure 14:
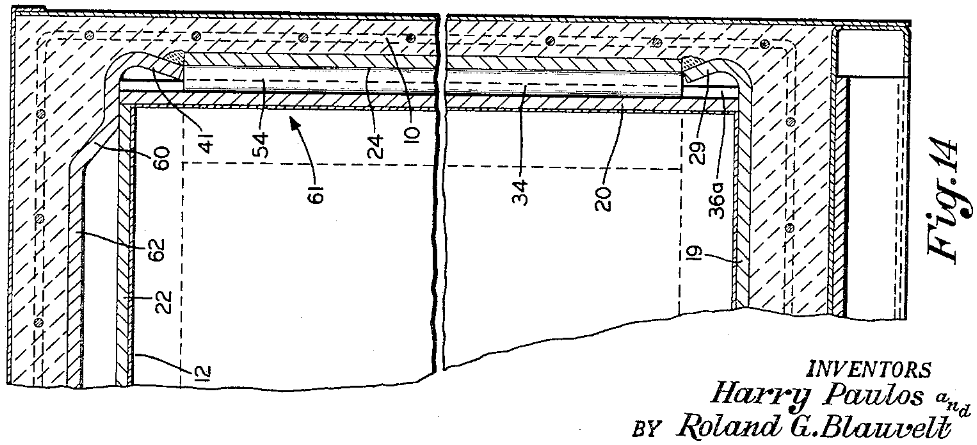
FIG. 14 is a view similar to FIG. 4 of the modified form of construction shown in FIG. 13.

In the modification shown in FIGS. 13 and 14, the construction is identical to that shown in FIGS. 1 through 8 excepting that the outer back plate 59 and the outer top plate 60 of the duplex-walled shell generally indicated at 61, are each provided with offset portions 62, similar to the offset portions 32 in the outer side plates 24 and 25.

Figure 15:
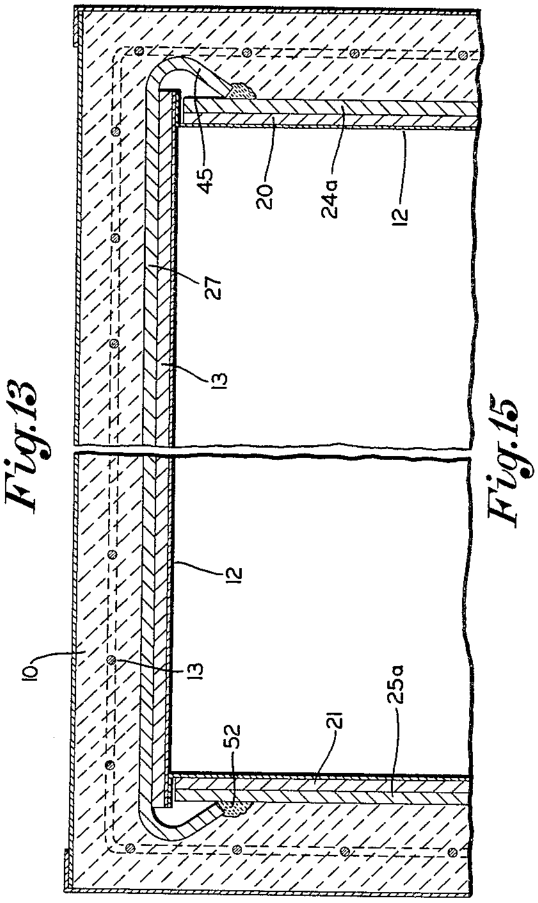
FIG. 15 is a view similar to FIGS. 3 and 13 of a still further modified form of construction.

In the modification shown in FIG. 15, the construction is the same as that of FIGS. 1 through 8 excepting that the offsets 32 are omitted in the outer side plates **24*a* and 25*a***. The resistance to wedge penetration of the modification of FIGS. 13 and 14, is typically shown in FIG. 10 while the resistance to penetration of the modification shown in FIG. 15 is typically shown in FIG. 11.

Accordingly, the present invention provides a new forced-entry-resistant security file construction which will pass the five minute forced entry wedge test; which at the same time meets the weight requirements for an insulated security file; which does not alter the general construction of prior similar insulated files that have not been capable of passing the forced entry wedge test and meeting the weight requirements; which thus may be made with production tools and facilities available without substantial additional cost for design changes and tooling; which satisfies a heretofore unsatisfied need in the art; and which accomplishes the indicated new results in a simplified and inexpensive manner.

In the foregoing description certain terms have been used for brevity, clearness and understanding, but no unnecessary limitations are to be implied therefrom beyond the requirements of the prior art, because such terms are utilized for descriptive purposes herein and not for the purpose of limitation, and are intended to be broadly construed.

Moreover, the description and illustration of the invention are by way of example and the invention is not limited to the exact dimensions and sizes of the structures shown because these may be varied to provide other structural embodiments without departing from the fundamental principles of the invention.

Having now described the features, discoveries and principles of the invention, the construction and manner in which forced entry is resisted in an insulated security file, and the advantageous, new and useful results obtained thereby; the new and useful apparatus, parts, ele-ments, combinations, sub-combinations, arrangements and constructions, and mechanical equivalents obvious to those skilled in the art, are set forth in the appended claims.

We claim:

1. In an insulated security file of a type having a five-sided cabinet provided with side, rear, top and bottom insulated walls comprising inner and outer light gauge sheet metal shells and insulation material therebetween, and a plurality of drawers having insulated drawer heads removably mounted in said cabinet; the combination of a duplex-walled, forced-entry-resistant shell in the cabinet walls; the forced-entry-resistant shell including a bottom plate, inner and outer side plates forming two spaced side walls, inner and outer top plates and inner and outer back plates; the bottom plate and outer side, top and back plates being secured together as an integral structure; and the inner side, top and back plates being trapped between the integral structure and said inner shell and being unrestrained inwardly by said integral structure; whereby the duplex-walled shell resists penetration by a wedge attempted to be driven therethrough.

2. The construction defined in claim 1 in which all of the plates forming the duplex-walled shell are aluminum alloy plates.

3. The construction defined in claim 2 in which the aluminum alloy plates are each from ⅛" to ¼" thickness.

4. The construction defined in claim 2 in which at least the outer side plates have offset portions providing cavities between the inner and outer side plates extending from the bottom plate to the top plate of the duplex-walled shell.

5. In an insulated security file of a type having a five-sided cabinet provided with side, rear, top and bottom insulated walls comprising inner and outer light gauge sheet metal shells and insulation material therebetween, and a plurality of drawers having insulated drawer heads removably mounted in said cabinet; the combination of a duplex-walled, forced-entry-resistant shell in the cabinet walls; the shell including a bottom plate, inner side plates forming two spaced side walls, an inner top plate, and an inner back plate; the forced-entry-resistant shell also including outer side plates adjacent the inner side plates, an outer top plate adjacent the inner top plate, and an outer back plate adjacent the inner back plate; the outer side plates each being formed with vertically extending outwardly offset portions connected by vertically extending shoulders with vertically extending flanges in contact with the inner side plates; the upper and lower ends of the offset portions of the outer side plates being notched to form ears at the top and bottom ends of the side plate flanges; the bottom plate and outer top plate each being provided with horizontally extending terminal flanges at their side edges; the ears of the outer side plates being trapped between said terminal flanges and the inner side plates; the terminal flanges also lying adjacent the upper and lower edges of the offset portions of the outer side plates and being welded thereto; the outer back plate being welded to the outer side plates and to the bottom and outer top plate; the bottom plate and outer side, top and back plates forming an integral structure; and the inner side, top and back plates being trapped between the integral structure and said inner shell and being unrestrained inwardly by said integral structure; whereby the duplex-walled shell resists penetration by a wedge attempted to be driven therethrough.

6. In an insulated security file of a type having a five-sided cabinet provided with side, rear, top and bottom insulated walls comprising inner and outer light gauge sheet metal shells and insulation material therebetween, and a plurality of drawers having insulated drawer heads removably mounted in said cabinet; the combination of a duplex-walled, forced-entry-resistant shell in the cabinet walls; the forced-entry-resistant shell including a bottom plate, inner side plates forming two spaced side walls, an inner top plate, and an inner back plate; the shell also including outer side plates adjacent the inner side plates, an outer top plate adjacent the inner top plate, and an outer back plate adjacent the inner back plate; the outer back plate being notched at each of its four corners; the outer back plate being provided with terminal flanges at its side edges extending vertically between said notched corners; the bottom plate and outer top plate each being provided with horizontally extending terminal flanges at their side and back edges; the upper and lower portions of the outer back plate extending between the notched corners being trapped between the bottom plate and outer top plate back terminal flanges and the inner back plates; the side terminal flanges of the bottom plate and outer top plate lying adjacent the upper and lower notched ends of the terminal side flanges of the outer back plate; the outer back plate terminal flanges being welded to the outer side plates, the bottom plate and outer top plate side flanges being welded to the outer side plates; the rear flange of each of the bottom plate and outer top plate being welded to the outer back plate; the bottom plate and outer side, top and back plates forming an integral structure; and the inner side, top and back plates being trapped between the integral structure and said inner shell and being unrestrained inwardly by said integral structure; whereby the duplex-walled shell resist penetration by a wedge attempted to be driven therethrough.

7. In an insulated security file of a type having a five-sided cabinet provided with side, rear, top and bottom insulated walls comprising inner and outer light gauge sheet metal shells and insulation material therebetween, and a plurality of drawers having insulated drawer heads removably mounted in said cabinet; the combination of a duplex-walled, forced-entry-resistant shell in the cabinet walls; the forced-entry-resistant shell including a bottom plate, inner side plates forming two spaced side walls, an inner top plate, and an inner back plate; the shell also including outer side plates adjacent the inner side plates, an outer top plate adjacent the inner top plate, and an outer back plate adjacent the inner back plate; the outer side plates each being formed with vertically extending outwardly offset portions connected by vertically extending shoulders with vertically extending flanges in contact with the inner side plates; the upper and lower ends of the offset portions of the outer side plates being notched to form ears at the top and bottom ends of the side plate flanges; the bottom plate and outer top plate each being provided with terminal flanges at their side edges extending horizontally from the front to rear edges thereof; the outer back plate being notched on each of its four corners; the outer back plate being provided with terminal flanges at its side edges extending vertically between said notched corners; the bottom plate and outer top plate also each being provided with horizontally extending terminal flanges at their back edges; the upper and lower portions of the outer back plate extending between the notched corners being trapped between the bottom plate and outer top plate back terminal flanges and the inner back plate; the ears of the outer side plates being trapped between the bottom plate and outer top plate side terminal flanges and the inner side plates; the side terminal flanges of the bottom plate and the outer top plate lying adjacent the upper and lower notched ends of the terminal side flanges of the outer back plate and also lying adjacent the upper and lower edges of the offset portions of the outer side plates and being welded to the latter; the outer back plate terminal flanges being welded to vertically extending shoulders in the outer side plates; the rear flange of each of the bottom plate and outer top plate being welded to the outer back plate; the bottom plate and outer side, top and back plates forming an integral structure; and the inner side, top and back plates being trapped between the integral structure and said inner shell and being unrestrained inwardly by said integral structure; whereby the duplex-walled shell resists penetration by a wedge attempted to be driven therethrough.

8. In an insulated security file of a type having a five-sided cabinet provided with side, rear, top and bottom insulated walls comprising inner and outer light gauge sheet metal shells and insulation material therebetween, and a plurality of drawers having insulated drawer heads removably mounted in said cabinet; the combination of a duplex-walled, forced-entry-resistant shell in the cabinet walls; the forced-entry-resistant shell including a bottom plate, inner side plates forming two spaced side walls, an inner top plate, and an inner back plate; the shell also including outer side plates adjacent the inner side plates, an outer top plate adjacent the inner top plate, and an outer back plate adjacent the inner back plate; at least certain of the outer side, top and back plates having offset portions formed therein providing cavities between said offset portions and their respective inner side, top and back plates; the bottom plate and the outer side, top and back plates being secured together as an integral structure; and the inner side, top and back plates being trapped between the integral structure and said inner shell and being unrestrained inwardly by said integral structure; whereby the duplex-walled shell resists penetration by a wedge attempted to be driven therethrough.

9. In an insulated security file of a type having a five-sided cabinet provided with side, rear, top and bottom insulated walls comprising inner and outer light gauge sheet metal shells and insulation material therebetween, and a plurality of drawers having insulated drawer heads removably mounted in said cabinet; the combination of a duplex-walled, forced-entry-resistant shell in the cabinet walls; the forced-entry-resistant shell including a bottom plate, inner side plates forming two spaced side walls, an inner top plate, and an inner back plate; the shell also including outer side plates adjacent the inner side plates, an outer top plate adjacent the inner top plate, and an outer back plate adjacent the inner back plate; at least certain of said outer side, top and back plates lying adjacent to and contiguous with their respective inner side, top and back plates; the bottom plate and outer side, top and back plates being secured together as an integral structure; and the inner side, top and back plates being trapped between the integral structure and said inner shell and being unrestrained inwardly by said integral structure; whereby the duplex-walled shell resists penetration by a wedge attempted to be driven therethrough.

References Cited in the file of this patent

UNITED STATES PATENTS

| | | |
|---|---|---|
| 902,051 | Brintnall et al. | Oct. 27, 1908 |
| 2,153,868 | Hunter | Apr. 11, 1939 |
| 2,321,039 | Nelson | June 8, 1943 |
| 2,810,616 | McClellan | Oct. 22, 1957 |
| 2,887,965 | Henkel et al. | May 26, 1959 |

FOREIGN PATENTS

| | | |
|---|---|---|
| 444,568 | Great Britain | Mar. 23, 1936 |